(12) United States Patent
Yavo et al.

(10) Patent No.: US 11,314,662 B2
(45) Date of Patent: Apr. 26, 2022

(54) PROVIDING A SECURE COMMUNICATION CHANNEL BETWEEN KERNEL AND USER MODE COMPONENTS

(71) Applicant: Fortinet, Inc., Sunnyvale, CA (US)

(72) Inventors: Udi Yavo, Herzlia (IL); Roy Katmor, San Francisco, CA (US); Ido Kelson, Tel-Aviv (IL)

(73) Assignee: Fortinet, Inc., Sunnyvale, CA (US)

( * ) Notice: Subject to any disclaimer, the term of this patent is extended or adjusted under 35 U.S.C. 154(b) by 243 days.

(21) Appl. No.: 16/809,706

(22) Filed: Mar. 5, 2020

(65) Prior Publication Data

US 2021/0279184 A1 Sep. 9, 2021

(51) Int. Cl.
*G06F 12/00* (2006.01)
*G06F 13/00* (2006.01)
*G06F 13/28* (2006.01)
*G06F 12/14* (2006.01)

(52) U.S. Cl.
CPC ...... *G06F 12/1483* (2013.01); *G06F 12/1416* (2013.01); *G06F 12/1458* (2013.01); *G06F 2212/1052* (2013.01); *G06F 2221/2143* (2013.01)

(58) Field of Classification Search
CPC ......... G06F 12/1483; G06F 2212/1052; G06F 2221/2143; G06F 12/1416; G06F 12/1458
USPC ....................................................... 711/163
See application file for complete search history.

(56) References Cited

U.S. PATENT DOCUMENTS

| 2005/0021680 A1* | 1/2005 | Ekis | G06F 9/5044 709/219 |
| 2014/0325163 A1* | 10/2014 | Arndt | G06F 12/1036 711/153 |
| 2021/0011652 A1* | 1/2021 | Shu | G06F 3/0679 |

OTHER PUBLICATIONS

IEEE Search results (Year: 2021).*

* cited by examiner

*Primary Examiner* — Edward J Dudek, Jr.
*Assistant Examiner* — Sidney Li
(74) *Attorney, Agent, or Firm* — HDC Intellectual Property Law, LLP (57) ABSTRACT

Systems and methods for implementing a secure communication channel between kernel and user mode components are provided. According to an embodiment, a shared memory is provided through which a kernel mode process and a user mode process communicate. The kernel mode process is assigned read-write access to the shared memory. The user mode process is assigned read-only access to the shared memory. An offset-based linked list is implemented within the shared memory. Kernel-to-user messages are communicated from the kernel mode process to the user mode process by adding corresponding nodes to the offset-based linked list. One or more kernel-to-user messages are read by the user mode process following the offset-based linked list in order. The kernel mode process is signaled by the user mode process that a kernel-to-user message has been consumed by the user mode process through an input output control (ioctl) system call or an event object.

20 Claims, 6 Drawing Sheets

PROVIDING A SECURE COMMUNICATION CHANNEL BETWEEN KERNEL AND USER MODE COMPONENTS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to establishing a secure communication channel between components running in kernel mode and components running in user mode. In particular, embodiments of the present invention relate to providing a shared memory in the form of an offset-based linked list, for example, through which a kernel mode process and a user mode process may perform asynchronous communications without the need for polling and while also avoiding disclosing any kernel pointers.

Description of the Related Art

Efficient and secure kernel to user communication is challenging. On one hand the kernel should not disclose any addresses, to avoid compromising computer security techniques, such as address space layout randomization (ASLR), that prevent user space processes from the exploitation of memory-corruption vulnerabilities to alter sensitive kernel data. On the other hand, for purposes of maintaining efficient communications, it is best to have minimal user-to-kernel transitions and to avoid requiring user-mode processes from polling the kernel.

SUMMARY

Systems and methods are described for providing a secure communication channel between kernel and user mode components. According to an embodiment, a shared memory is provided through which a kernel mode process and a user mode process communicate. The kernel mode process is assigned read-write access to the shared memory. The user mode process is assigned read-only access to the shared memory. An offset-based linked list is implemented within the shared memory. Kernel-to-user messages are communicated from the kernel mode process to the user mode process by adding corresponding nodes to the offset-based linked list. One or more kernel-to-user messages are read by the user mode process following the offset-based linked list in order. The kernel mode process is signaled by the user mode process that a kernel-to-user message has been consumed by the user mode process through an input output control (ioctl) system call or an event object.

Other features of embodiments of the present disclosure will be apparent from accompanying drawings and detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for providing a secure communication channel between kernel and user mode components. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memory (RAM), dynamic RAM (DRAM), static RAM (SRAM), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, the phrase "user mode" generally refers to a state of an operating system (OS) representing a non-privileged mode of execution. Code executed in user mode generally has no ability to directly access hardware or reference memory and does so indirectly via an application programming interface (API) provided by the OS or via system calls. Untrusted processes (e.g., user applications) are generally run in user mode.

As used herein, the phrase "kernel mode" generally refers to a state of an OS representing a privileged mode of execution. Code that is part of the central part or core (i.e., kernel) of the OS operating system that manages a computer's resources and allows other programs to run and use these resources is run in kernel mode. Code running in kernel mode has complete and unrestricted access to the underlying hardware of the computer system are run. Embodiments described herein are applicable to any modern operating system (e.g., Windows, Unix, Linux, and macOS) supporting a user mode and a kernel mode.

The phrase "data feed" generally refers to a security event classification source. Non-limiting examples of data feeds include various types of endpoint protection platforms, antivirus engines, static malware analysis engines, dynamic malware analysis engines, memory forensic engines, sandboxes, User and Entity Behavior Analytics (UEBA), Intrusion Detection Systems (IDSs), content inspection engines, distributed denial of service (DDoS) mitigation engines, machine-learning classifiers, file threat-feeds, Internet Protocol (IP)/uniform resource locator (URL) threat feeds, Indicators of compromise (IOC) threat feeds, file reputation services, IP/URL reputation services, vulnerability discovery services, Tactics Techniques and Procedures (TTPs) feeds, security events collected from another private network, Endpoint Detection and Response (EDR) data, and the like.

The phrase "endpoint protection platform" generally refers to cybersecurity monitoring and/or protection functionality implemented on an endpoint device. In one embodiment, the endpoint protection platform can be deployed in the cloud or on-premises and supports multi-tenancy. The endpoint protection platform may include a kernel-level Next Generation AntiVirus (NGAV) engine with machine learning features that prevent infection from known and unknown threats and leverage code-tracing technology to detect advanced threats such as in-memory malware. The endpoint protection platform may be deployed on the endpoint device in the form of a lightweight endpoint agent that utilizes less than one percent of CPU and less than 100 MB of RAM and may leverage, among other things, various security event classification sources provided within an associated cloud-based security service. Non-limiting examples of an endpoint protection platform include the Software as a Service (SaaS) enSilo Endpoint Security Platform and the FORTICLIENT integrated endpoint protection platform available from Fortinet, Inc. of Sunnyvale, Calif. In one embodiment, an endpoint protection platform may leverage various security event classification sources implemented within an associated cloud-based security service. The cloud-based security service may be implemented within a public cloud, a private cloud or a hybrid cloud. Non-limiting examples of a cloud-based security service include the enSilo Cloud Service and FORTIGUARD security services available from the assignee of the present invention.

The term "event" generally refers to an action or behavior of a process running on an endpoint device. Non-limiting examples of events include filesystem events and operating system events. Events that may be initially classified as suspicious or malicious by a heuristic engine and/or a machine-learning engine employed by the endpoint protection platform, for example, may include an attempt to communication with a critical software vulnerability (CVE), an attempt to access the registry of the operating system, the network or the file system, an attempt by the process to copy itself into another process or program (in other words, a classic computer virus), an attempt to write directly to the disk of the endpoint device, an attempt remain resident in memory after the process has finished executing, an attempt to decrypt itself when run (a method often used by malware to avoid signature scanners), an attempt to binds to a TCP/IP port and listen for instructions over a network connection (this is pretty much what a bot—also sometimes called drones or zombies—do), an attempt to manipulate (copy, delete, modify, rename, replace and so forth) files that are associated with the operating system, an attempt to read the memory of sensitive programs, an attempt to hook keyboard or mouse (AKA keylogging), an attempt capture a screen shot, an attempt to record sounds, and/or other behaviors or actions that may be similar to processes or programs known to be malicious. In one embodiment, events may be detected or intercepted by the endpoint protection platform hooking filesystem and/or operating system application programming interface (API) calls of interest and/or by leveraging a hypervisor to monitor the operating system.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Figure 1A:
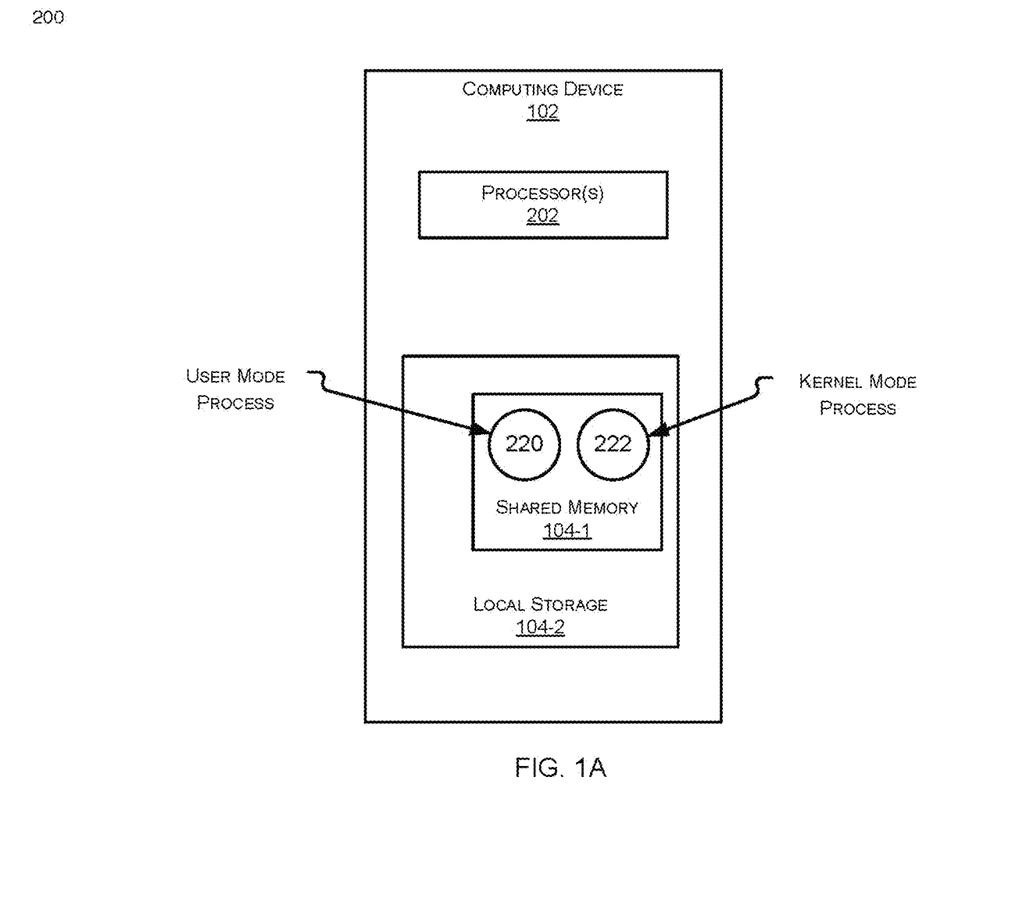
FIG. 1A illustrates an exemplary system in which a secure communication channel may be used in accordance with an embodiment of the present invention.

FIG. 1A illustrates an exemplary system in which a secure communication channel may be used in accordance with an embodiment of the present invention. A system 200 for executing a process can include a computing device 102, for example, a computer, a processing node, a server, a mobile device, a Smartphone, a tablet and/or the like. In practice, the computing device 102 may be any device comprising one or more processor(s) capable of executing software code instructions.

In the context of the present example, the computing device 201 comprises a processor(s) 202 and local storage 104-2. The processor(s) 202 comprises one or more one or more processors (homogenous or heterogeneous), which may be arranged for parallel processing, as clusters and/or as one or more distributed core processing units. The processor(s) 202 may execute one or more software modules wherein a software module refers to a plurality of program instructions stored in a storage medium such as the local storage 104-2 and executed by the processor(s) 202. The local storage 104-2 may include one or more non-transitory storage devices, for example, a hard drive, a Flash array, an attached storage media and/or the like. The local storage 104-2 may further include one or more volatile storage devices, for example, a random access memory (RAM) to which one or more software modules may be loaded from one or more of the non-transitory storage devices and/or from one or more remote locations over one or more networks.

Typically, the computing device 102 may further include one or more network interfaces for connecting to one or more networks, for example, a Local Area Network (LAN), a Wide Area Network (WAN), a cellular network, the internet and/or the like.

The processor(s) 202 may execute one or more one or more software modules, wherein a software module may be, for example, a process, an application, an agent, a utility, a service, a plug-in, a script, an add-on software and/or the like each comprising a plurality of program instructions stored in a non-transitory medium such as the program store 104-2 and executed by one or more processors such as the processor(s) 202. Typically, the computing device 102 hosts an OS, for example, Windows, Linux, UNIX, iOS, Android and/or the like which provides a runtime processing environment, services, infrastructure and/or the like for the software module(s) executed by the processor(s) 202.

In the context of the present example, the processor(s) 202 is shown executing a user mode process 220 and a kernel mode process, both of which have access to a portion (e.g., shared memory 104-1) of the local storage 104-2. In order to enable secure communication between kernel mode process 222 and user mode process 220, the kernel mode process 222 can be allocated or assigned read-write access to the shared memory 104-1 to allow writing or storing of kernel-to-user messages to the shared memory 104-1. In contrast, user mode process 220 can be allocated or assigned read-only access to the shared memory 104-1 to limit the user mode process 220 to accessing or reading the stored kernel-to-user messages from the shared memory 104-1.

According to one embodiment, the kernel-to-user messages are delivered from the kernel mode process 222 to the user mode process 220 via a data structure implemented within the shared memory 104-1. For example, an offset-based linked list (not shown) may be implemented within the shared memory 104-1 to avoid sharing sensitive information associated with kernel pointers. The kernel-to-user messages can be read by the user mode process 220 by following the offset-based linked list by following an order of the linked list. Further details regarding an example offset-based linked list that may be used as a secure communication channel between kernel and user mode components is described with reference to FIG. 2. Using an offset-based circular linked list instead of pointer-based list ensures that it is impossible for a user mode process to discover in what virtual-address the kernel mapped the shared memory and thus ensuring ASLR integrity is not compromised.

In one embodiment, the user mode process 220 can signal the kernel mode process 222 that the stored or written kernel-to-user message has been consumed by the user mode process 220 through an input output control (ioctl) system call or an event object etc. Further, the consuming of the kernel-to-user message by the user mode process 220 is independent of writing or storing of the kernel-to-user message by the kernel mode process 222. The kernel-to-user messages may be deleted after a first pre-defined time period, and consuming of the kernel-to-user message can be repeated after a second pre-defined time period.

Figure 1B:
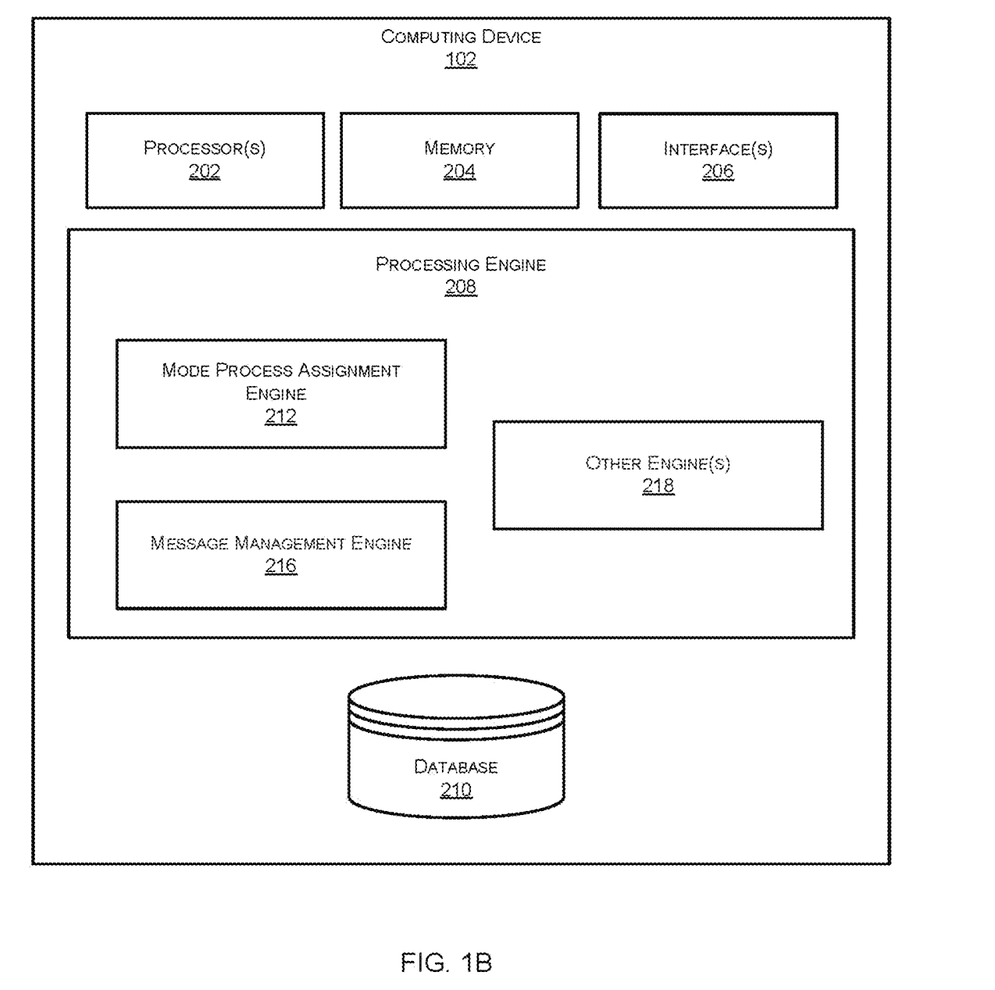
FIG. 1B is a block diagram illustrating functional components of a system in accordance with an embodiment of the present invention.

FIG. 1B is a block diagram illustrating functional components of a system in accordance with an embodiment of the present invention. In the context of the present example, computing device 102 can include one or more processor(s)

202. Processor(s) 202 can be implemented as one or more microprocessors, microcomputers, microcontrollers, digital signal processors, application-specific integrated circuits (ASICs), field programmable gate arrays (FPGAs), central processing units, logic circuitries, and/or any devices that manipulate data based on operational instructions, which may be generally referred to herein individually as a processing resource. Among other capabilities, processor(s) 202 are operable to fetch and execute computer-readable instructions stored in a memory 204 of computing device 102. Memory 204 can store one or more computer-readable instructions or routines, which may be fetched and executed to perform various functionality described herein. Memory 204 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

Computing device 102 can also include one or more interface(s) 206. Interface(s) 206 may include a variety of interfaces, for example, interfaces for data input and output devices, referred to as I/O devices, storage devices, and the like. Interface(s) 206 may facilitate communication of computing device 102 with various devices coupled to computing device 102. Interface(s) 206 may also provide a communication pathway for one or more components of computing device 102. Examples of such components include, but are not limited to, processing engine(s) 208 and database 210.

Processing engine(s) 208 can be implemented as a combination of hardware and software or firmware programming (for example, programmable instructions) to implement one or more functionalities of engine(s) 208. In the examples described herein, such combinations of hardware and software or firmware programming may be implemented in several different ways. For example, the programming for the engine(s) may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, computing device 102 can include the machine-readable storage medium storing the instructions and the processing resource to execute the instructions, or the machine-readable storage medium may be separate but accessible to computing device 102 and the processing resource. In other examples, processing engine(s) 208 may be implemented by electronic circuitry. Database 210 can include data that is either stored or generated as a result of functionalities implemented by any of the components of processing engine(s) 208.

In an example, processing engine(s) 208 can include a mode process assignment engine 212, a data synchronization engine 214, a message management engine 216, and other engine(s) 218. Other engine(s) 218 can implement functionalities that supplement applications or functions performed by computing device 102 or processing engine(s) 208.

In an embodiment, the mode process assignment engine 212 can be responsible for providing a secure communication channel between a kernel mode process and a user mode process, including configuring access to a shared memory of a local storage of the endpoint device. Further, the kernel mode process can be allocated or assigned a read-write access to the shared memory to allow writing or storing of kernel-to-user messages to the shared memory, and the user mode process can be allocated or assigned a read-only access to the shared memory to enable the user mode process to access or read the stored kernel-to-user messages from the shared memory.

In an embodiment, the message management engine 216 can be configured to enable reading or accessing of the kernel-to-user messages by the user mode process by following the offset-based linked list (e.g., a circular, offset-based linked list) by following an order of the linked list. The user mode process can signal the kernel mode process that the stored or written kernel-to-user message has been consumed by the user mode process through an input output control (ioctl) system call or an event object etc. Further, the consuming of the kernel-to-user message by the user mode process is independent of writing or storing of the kernel-to-user message by the kernel mode process. The kernel-to-user messages may be deleted after a first pre-defined time period, and consuming of the kernel-to-user message can be repeated after a second pre-defined time period.

Figure 2:
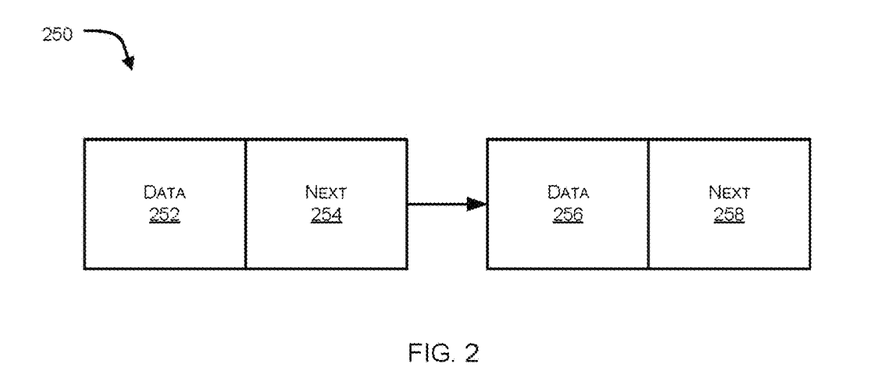
FIG. 2 illustrates an exemplary conceptual illustration of a linked list in accordance with an embodiment of the present disclosure.

FIG. 2 illustrates an exemplary conceptual illustration of a linked list 250 in accordance with an embodiment of the present disclosure. In an embodiment, the linked list 250 is implemented within a shared memory (e.g., shared memory 104-1) to which both a user mode process (e.g., user mode process 220) and a kernel mode process (e.g., kernel mode process 222) have access (albeit, different access permissions). The linked list 250 may be an offset-based linked list (or more specifically, a circular, offset-based linked list) in which the next element (or list node) in the linked list 250 is located at a predetermined offset from the beginning of the linked list 250 or from the prior element rather than using pointers. In this manner, sharing sensitive information with the user mode process associated with kernel pointers is avoided. As illustrated, each node of the linked list 250 can include data (e.g., 252 and 256) and a next node offset (e.g., 254 and 258).

Figure 3:
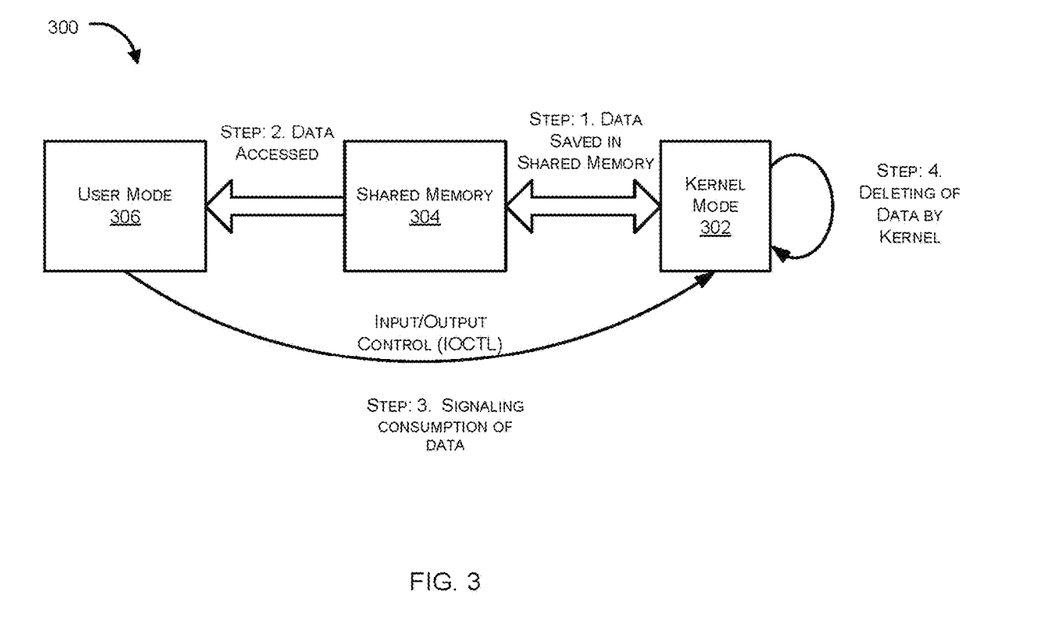
FIG. 3 conceptually illustrates an example of communication between user mode and kernel mode in accordance with an embodiment of the present disclosure.

FIG. 3 conceptually illustrates an example of communication between user mode 306 and kernel mode 302 in accordance with an embodiment of the present disclosure. In the context of the present example 300, step 1 pertains to saving a kernel-to-user message in a shared memory 304 during execution of a process in kernel mode 302. At step 2, a kernel-to-user message may be consumed or accessed from the shared memory 304 by a process being executed in user mode 306. At step 3, the kernel mode 302 process can be signaled by the user mode process 306 through an ioctl system call or an event object that the kernel to-user message has been consumed. At step 4, responsive to the signal from the user mode process 306, the kernel mode 302 process may delete the kernel-to-user message. Depending upon the particular implementation, the kernel may allow multiple processes to handle messages at its discretion by simply mapping the same shared memory to their address space.

Figure 4:
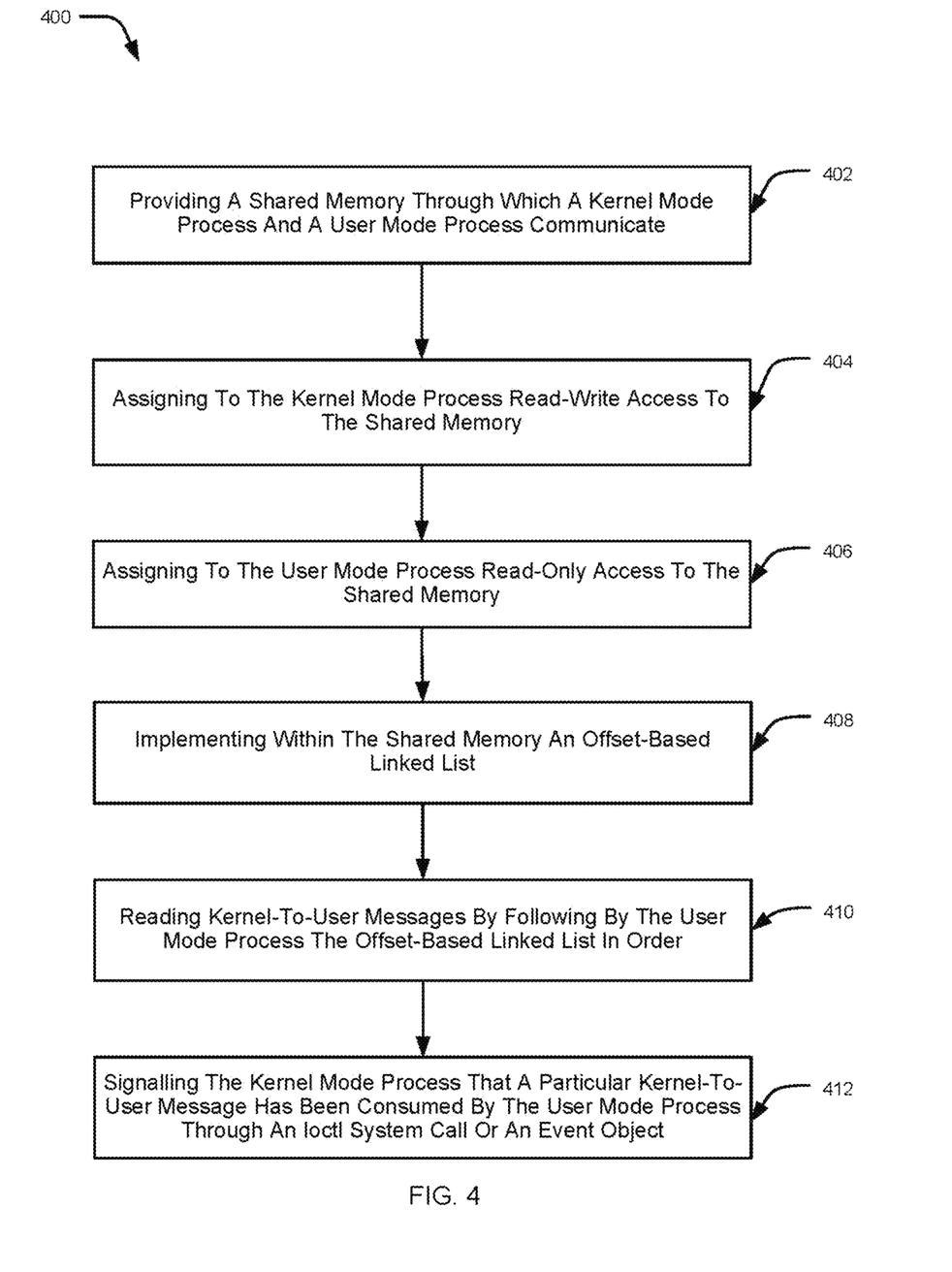
FIG. 4 is a flow diagram illustrating a process for providing secure communication in accordance with an embodiment of the present disclosure.

FIG. 4 is a flow diagram 400 illustrating a process for providing secure communication in accordance with an embodiment of the present disclosure. The processing described with reference to the flow diagram 400 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer device 102 described above with reference to FIGS. 1 and 2 or computer system 500 described with reference to FIG. 5 below.

At block 402, a shared memory (e.g., shared memory 104-1) is provided though which a kernel mode process (e.g., kernel mode process 222) and a user mode process (e.g., user mode process 220) may communicate. For example, the shared memory may represent a predefined or configurable portion of main memory (e.g., RAM, DRAM or SRAM).

At block 404, the kernel mode process is assigned read-write access to the shared memory. For example, the shared memory may be mapped to the kernel mode process with access rights set to allow both modification (write) and read access rights to the memory region(s) at issue by the kernel mode process. In this manner, the kernel mode process may create, store, modify and delete kernel-to-user messages for consumption by the user mode process.

At block 406, the user mode process is assigned read-only access to the shared memory. For example, the shared memory may be mapped to the user mode process with access rights set to allow for only read access rights (no modification (write) and no execution rights) to the memory region(s) at issue by the user mode process. In this manner, the user mode process may access the kernel-to-user messages originated by the kernel mode process, but may not modify or delete the kernel-to-user messages and may not write to any other portion of the shared memory.

At block 408, an offset-based linked list is implemented within the shared memory. As no pointers are used to implement the offset-based linked list, sensitive information associated with kernel pointers is not shared with the user mode process.

At block 410, the user mode process reads one or more kernel-to-user messages by following the offset-based linked list in order. In one embodiment, the communication exchange using the secure channel follows a convention in which the kernel-to-user messages are consumed in order. In one embodiment, responsive to being signaled by the kernel that one or more new messages are available, the user mode process may sequentially consume the queued kernel-to-user messages until the queue is empty. At that time, the user process may go back to waiting for new messages.

At block 412, the user mode process signals the kernel mode process that it has consumed a kernel-to-user message through an ioctl system call or an event object. As noted above, in one embodiment, assuming the user mode process follows an agreed convention of processing the kernel-to-user messages in order various simplifications can be made to the communication protocol. For example, following of this convention obviates the need for the kernel mode process to have information regarding the particular kernel-to-user message that has been consumed as the kernel mode process can simply assume when it is signaled by the user mode process that a kernel-to-user message has been processed, the signal relates to the oldest kernel-to-user message for which a signal has not yet been received from the user mode process. Of course, this convention is optional, but it is thought to provide efficiencies. As those skilled in the art will appreciate, in alternative embodiments, the kernel-to-user messages may be assigned sequence numbers and such sequence numbers may be used to indicate via the signaling from the user mode process to the kernel mode process which particular kernel-to-user message has been consumed. Alternatively, the linked list offsets may be used as sequence numbers.

As those skilled in the art will appreciate in view of the foregoing description, embodiments provide secure and asynchronous messaging. For example, a kernel mode process can move forward after writing a kernel-to-user message to the shared memory, within which a data structure (e.g., a circular, offset-based linked list) operates as a queue, as the kernel mode process does not require or expect an immediate response from the user mode process. Similarly, the user mode process need not poll the kernel mode process to see if the kernel mode process has any messages for the user mode process. Instead, in embodiments described herein, the user mode process may be signaled by the kernel when new messages are available, this can be done via an Event object or alternative signaling mechanisms. Responsive to being signaled by the kernel that one or more new messages are available, the user mode process may consume messages until the queue is empty. At that time, the user process may go back to waiting for new messages.

In one particular usage scenario, which is described in further detail with reference to FIG. 6, the secure communication channel may be used for sending security events for processing by a user mode service that runs a local security policy for the computer system at issue. Such a usage scenario allows a complex security policy to be implemented in any programming language in user mode while having the kernel make decisions based on that policy in an efficient manner. Note that in various embodiments when the user mode process signals the kernel that a message has been processed it can optionally send more information. For example, in the context of enforcing security policies, the user mode service may signal the kernel to block a specific behavior.

Figure 5:
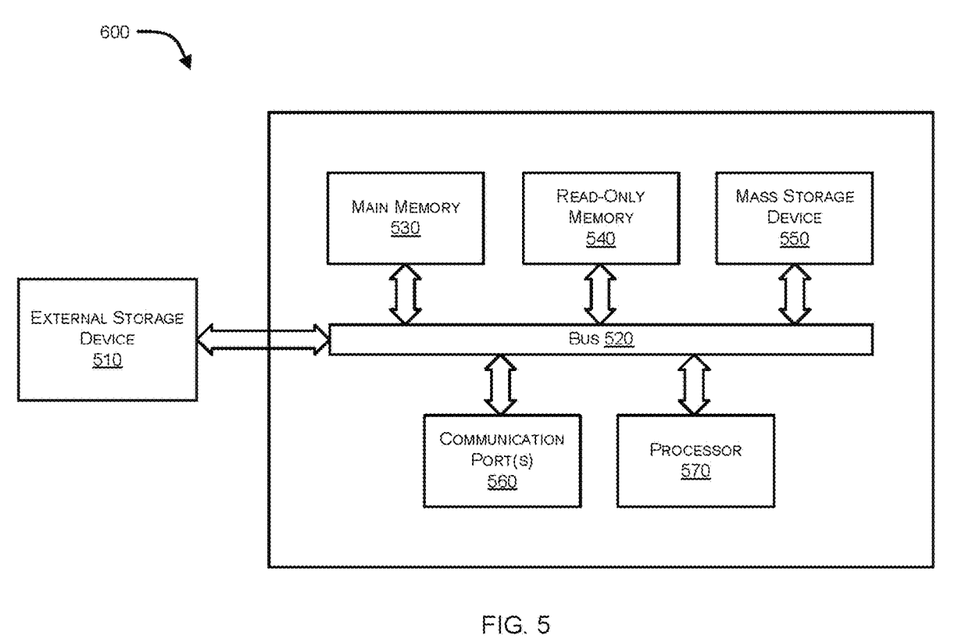
FIG. 5 illustrates an exemplary computer system in which or with which embodiments of the present invention may be utilized.

FIG. 5 illustrates an exemplary computer system 500 in which or with which embodiments of the present invention may be utilized. For example, computer system 500 may represent an endpoint device (e.g., computing device 102). While various examples described herein are described with reference to physical computer systems, those skilled in the art will appreciate the functionality and methodologies described herein are equally applicable to computing environments (e.g., a data center or cloud) in which functionality is deployed on virtual machines or as a service in the context of a container, a pod, or other virtualized environment.

As shown in FIG. 5, computer system 500 includes an external storage device 510, a bus 520, a main memory 530, a read only memory 540, a mass storage device 550, a communication port 560, and a processor 570.

Those skilled in the art will appreciate that computer system 500 may include more than one processor 570 and communication ports 560. Examples of processor 570 include, but are not limited to, an Intel® Itanium® or Itanium 2 processor(s), or AMD® Opteron® or Athlon MP® processor(s), Motorola® lines of processors, Forti-SOC™ system on a chip processors or other future processors. Processor 570 may include various modules associated with embodiments of the present invention.

Communication port 560 can be any of an RS-232 port for use with a modem based dialup connection, a 10/100 Ethernet port, a Gigabit or 10 Gigabit port using copper or fiber, a serial port, a parallel port, or other existing or future ports. Communication port 560 may be chosen depending on a network, such a Local Area Network (LAN), Wide Area Network (WAN), or any network to which computer system connects.

Memory 530 can be Random Access Memory (RAM), or any other dynamic storage device commonly known in the art. Read only memory 540 can be any static storage device(s) e.g., but not limited to, a Programmable Read Only Memory (PROM) chips for storing static information e.g. start-up or BIOS instructions for processor 570.

Mass storage 550 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 520 communicatively couples processor(s) 570 with the other memory, storage and communication blocks. Bus 520 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 570 to software system.

Optionally, operator and administrative interfaces, e.g. a display, keyboard, and a cursor control device, may also be coupled to bus 520 to support direct operator interaction with computer system. Other operator and administrative interfaces can be provided through network connections connected through communication port 560. External storage device 510 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Figure 6:
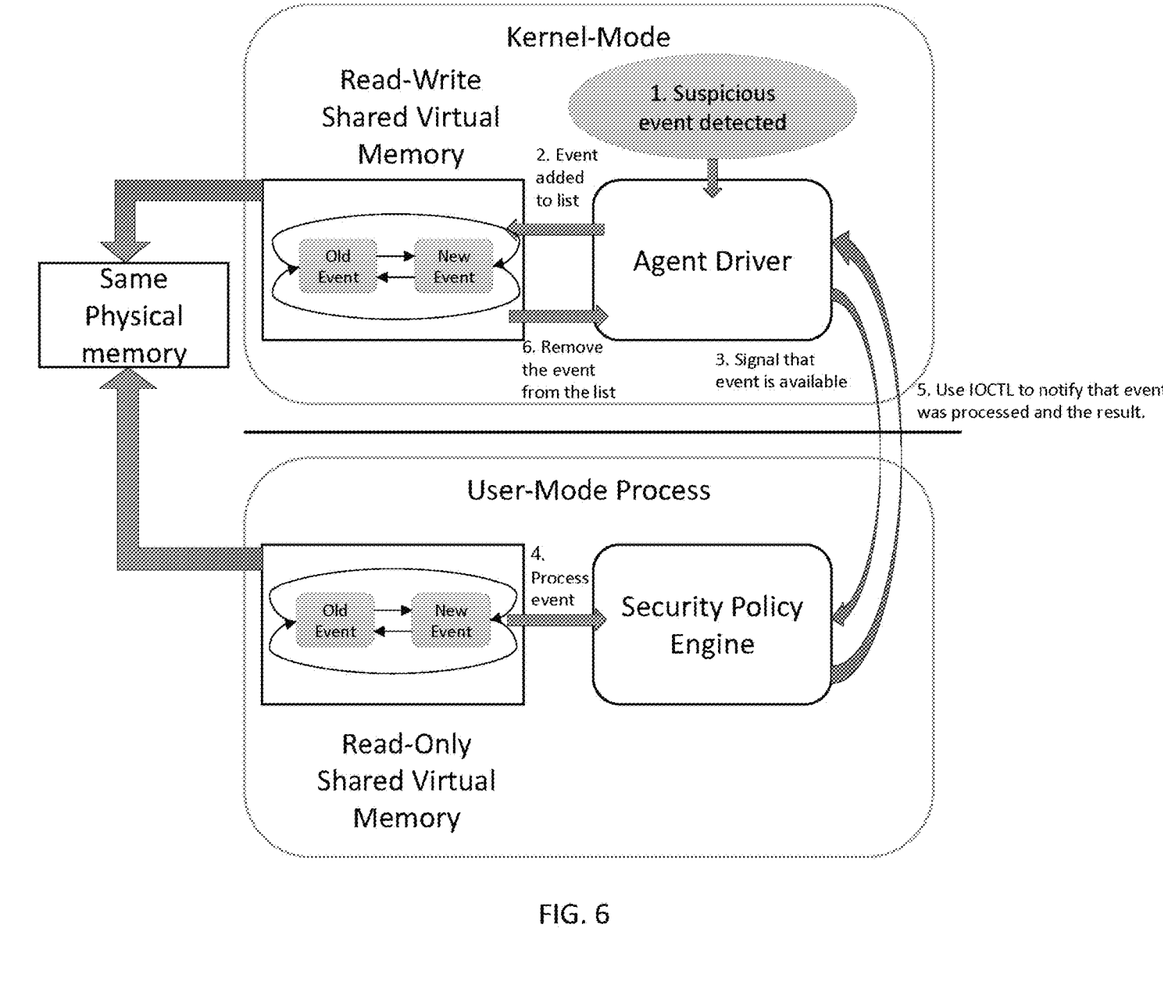
FIG. 6 conceptually illustrates an example usage scenario in accordance with an embodiment of the present invention.

FIG. 6 conceptually illustrates an example usage scenario in accordance with an embodiment of the present invention. In the context of the present example, the secure communication channel is used for sending security events for processing by a security policy engine representing a user mode service that runs a local security policy for the an endpoint computer system. This usage scenario allows a complex security policy to be implemented in any programming language in user mode while having the kernel make decisions based on that policy in an efficient manner.

This example usage scenario is provided to illustrate non-limiting examples of the above-described user mode process, kernel mode process and shared memory. In the context of the present example, an agent driver (an example of a kernel mode process) runs in kernel mode and the security policy engine (an example of a user mode process) runs in user mode. In this example, the agent driver is able to securely communicate with the security policy engine via respective shared virtual memories (having different access permissions) that are mapped to the same physical memory.

The agent driver and the security policy engine may be part of an endpoint protection platform performing cybersecurity monitoring and/or providing cybersecurity protection to an endpoint device and may receive information regarding detection of suspicious events from an associated cloud-based security service that implements various data feeds or security event classification sources, which may be applied to information supplied to the cloud by the endpoint protection platform.

In the context of the present example, responsive to receiving an indication regarding a suspicious event detected locally or by the cloud, the agent driver adds a kernel-to-user message containing information regarding the event to a list (e.g., the above-described circular, offset-based linked list) within the shared memory and signals the security policy engine that a kernel-to-user message is available. The security policy engine may then read the kernel-to-user message from the shared virtual memory, process the event, and notify (e.g., via IOCTL) the agent driver that the kernel-to-user message was processed (and optionally provide the result of processing the event). Note that in various embodiments when the user mode process signals the kernel that a message has been processed it can optionally send more information. For example, in the present context relating to enforcing security policies, the security policy engine may signal the agent driver to block a specific behavior or event (e.g., a file system event, a network event or an operating system event initiated by a process running on the endpoint device). Responsive to receiving the notification that the security policy engine has processed the kernel-to-user message, the agent driver may act on the additional information, if any, provided by the security policy engine, for example, by blocking the specific behavior or event, and remove the processed kernel-to-user message from the list.

It will be appreciated by those of ordinary skill in the art that the diagrams, schematics, illustrations, and the like represent non-limiting example embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular ones named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A computer-implemented method comprising:
providing a shared memory through which a kernel mode process and a user mode process communicate;
assigning to the kernel mode process read-write access to the shared memory;
assigning to the user mode process read-only access to the shared memory;
implementing within the shared memory an offset-based linked list;
communicating, by the kernel mode process, a plurality of kernel-to-user messages from the kernel mode process to the user mode process by adding corresponding nodes to the offset-based linked list;
reading, by the user mode process, one or more kernel-to-user messages of the plurality of kernel-to-user message by following by the offset-based linked list in order; and
signalling the kernel mode process that a kernel-to-user message of the plurality of kernel-to-user messages has been consumed by the user mode process through an input output control (ioctl) system call or an event object.

2. The computer implemented method of claim 1, wherein the method comprises deleting, by the kernel mode process, the plurality of kernel-to-user messages after a first pre-defined time-period.

3. The computer implemented method of claim 1, wherein said reading, by the user mode process, is independent of the kernel mode process.

4. The computer implemented method of claim 3, wherein said reading, by the user mode process, is repeated after a second pre-defined time period.

5. The computer implemented method of claim 1, wherein the user mode process comprises a user mode service running a local security policy of an endpoint security solution.

6. The computer implemented method of claim 5, wherein said signalling further comprises the user mode service requesting the kernel mode process to block a specific behavior.

7. The computer implemented method of claim 1, wherein the user mode process is denied of write access rights to the shared memory.

8. The computer implemented method of claim 1, wherein the offset-based linked list operates as a queue.

9. The computer implemented method of claim 1, wherein the offset-based linked list comprises a circular, offset-based linked list.

10. A system comprising:
a processing resource; and
a non-transitory computer-readable medium, coupled to the processing resource, having stored therein instructions that when executed by the processing resource cause the processing resource to:
configure a shared memory through which a kernel mode process and a user mode process communicate, including:
assigning to the kernel mode process read-write access to the shared memory; and
assigning to the user mode process read-only access to the shared memory;
implement within the shared memory an offset-based linked list;
communicate, by the kernel mode process, a plurality of kernel-to-user messages from the kernel mode process to the user mode process by adding corresponding nodes to the offset-based linked list;
read, by the user mode process, one or more kernel-to-user messages of the plurality of kernel-to-user message by following by the offset-based linked list in order; and
signal the kernel mode process that a kernel-to-user message of the plurality of kernel-to-user messages has been consumed by the user mode process through an input output control (ioctl) system call or an event object.

11. The system of claim 10, wherein the instructions further cause the processing resource to delete, by the kernel mode process, the plurality of kernel-to-user messages after a first pre-defined time-period.

12. The system of claim 10, wherein reading, by the user mode process, of the one or more kernel-to-user messages is independent of the kernel mode process.

13. The system of claim 12, wherein reading, by the user mode process, is repeated after a second pre-defined time period.

14. A non-transitory machine readable medium storing instructions, which when executed by a processing resource of a computer system cause the processing resource to:
configure a shared memory of the computer system through which a kernel mode process and a user mode process communicate, including:
assigning to the kernel mode process read-write access to the shared memory; and
assigning to the user mode process read-only access to the shared memory;
implement within the shared memory an offset-based linked list;
communicate, by the kernel mode process, a plurality of kernel-to-user messages from the kernel mode process to the user mode process by adding corresponding nodes to the offset-based linked list;
read, by the user mode process, one or more kernel-to-user messages of the plurality of kernel-to-user message by following by the offset-based linked list in order; and
signal the kernel mode process that a kernel-to-user message of the plurality of kernel-to-user messages has been consumed by the user mode process through an input output control (ioctl) system call or an event object.

15. The non-transitory machine readable medium of claim 14, wherein the instructions further cause the processing resource to delete, by the kernel mode process, the plurality of kernel-to-user messages after a first pre-defined time-period.

16. The non-transitory machine readable medium of claim 14, wherein reading, by the user mode process, is independent of the kernel mode process.

17. The non-transitory machine readable medium of claim 16, wherein reading, by the user mode process, is repeated after a second pre-defined time period.

18. The non-transitory machine readable medium of claim 14, wherein the user mode process comprises a user mode service running a local security policy of an endpoint security solution.

19. The non-transitory machine readable medium of claim 18, wherein concurrently with signalling of the kernel mode process that the kernel-to-user message of the plurality of kernel-to-user messages has been consumed the user mode service requests the kernel mode process to block a specific behavior.

20. The non-transitory machine readable medium of claim 14, wherein the offset-based linked list comprises a circular, offset-based linked list that operates as a queue.

\* \* \* \* \*